April 21, 1936.  H. C. RENTSCHLER  2,037,924
X-RAY INTENSITY METER
Filed Dec. 24, 1928    2 Sheets-Sheet 1

INVENTOR
H.C. RENTSCHLER
BY
ATTORNEY

April 21, 1936. H. C. RENTSCHLER 2,037,924
X-RAY INTENSITY METER
Filed Dec. 24, 1928 2 Sheets-Sheet 2

INVENTOR
H. C. RENTSCHLER
BY
ATTORNEY

Patented Apr. 21, 1936

2,037,924

UNITED STATES PATENT OFFICE 2,037,924

X-RAY INTENSITY METER

Harvey C. Rentschler, East Orange, N. J., assignor to Westinghouse Lamp Company, a corporation of Pennsylvania Application December 24, 1928, Serial No. 328,243

13 Claims. (Cl. 250—34)

This invention relates to a system for indicating and/or measuring the quantity or amount of electro-magnetic radiations in the visible or invisible regions over a period of time and for utilizing such radiations to determine the period of operation of or subjection of a person or object to a source of such radiations.

In the operation of X-ray tubes for instance, it is necessary, in many cases to limit the amount of X-rays generated in order to prevent detrimental effects on patients being treated or over-exposure of a photographic plate or to prevent over-heating of the tube itself and consequent impairment thereof.

It is also desirable in utilizing ultraviolet light for various purposes, as for treating patients, effecting chemical reactions, etc., to know accurately the intensity of the ultraviolet light so that the quantity thereof may be definiely controlled.

Another field in which the present invention is useful is in determining the average intensity of artificial or daylight illumination in various localities, as for instance, in determining smoke nuisance or in factory illumination, etc.

One of the objects of the present invention is, therefore, to provide a system whereby the quantity of electro-magnetic radiations to which a person or object is subjected, may be measured, and if desired, permanently recorded.

Another object is to provide a system for indicating the quantity or intensity of X-rays or ultraviolet rays produced by an X-ray apparatus or ultraviolet light source.

Another object is to provide a system for signalling or terminating the operation of an X-ray tube or other ray generating device after a prepetermined quantity of such rays have been generated.

Other objects and advantages will hereinafter appear.

In accordance with my invention I pass the rays, which may consist of visible light, ultra violet light or X-radiations, into a discharge device which is sensitive to such radiations to cause a small electric current flow through the device, the amount of the current flow depending upon the intensity of the radiations. The ray sensitive device is connected to a source of potenial and to a condenser of predetermined capacity so that after the ray sensitive device has been subjected to a definite quantity of the radiations being investigated the condenser will acquire a definite potential. The terminals of the condenser are connected to the terminals of a gaseous conduction device having a definite breakdown potential such as a gaseous discharge lamp or a glow relay tube. When the condenser has acquired a charge having a potential equal to the breakdown voltage of the gaseous conduction device the condenser discharges through the device and either records the discharge, operates a signal or sets mechanism into operation to terminate the source of the radiations.

Since the quantity of the radiations required to initiate the discharge in the gaseous conduction device is definite, the average intensity of the radiation can be determined by the number of such discharges occurring over a period of time.

In the case of X-radiations, the ray sensitive device may comprise an ionization chamber in which the degree of ionization of the gas therein, and consequently the current flow therethrough is dependent upon the quantity of X-rays passing therein. In the case of visible light and ultraviolet radiations a photo-electric cell sensitive to the particular band of radiations involved, may be employed.

In order that the invention may be more fully understood reference will be had to the accompanying drawings in which, Fig. 1 is a diagrammatic showing of a system for controlling the operation of an X-ray tube in accordance with the quantity of such rays produced.

Figure 1:
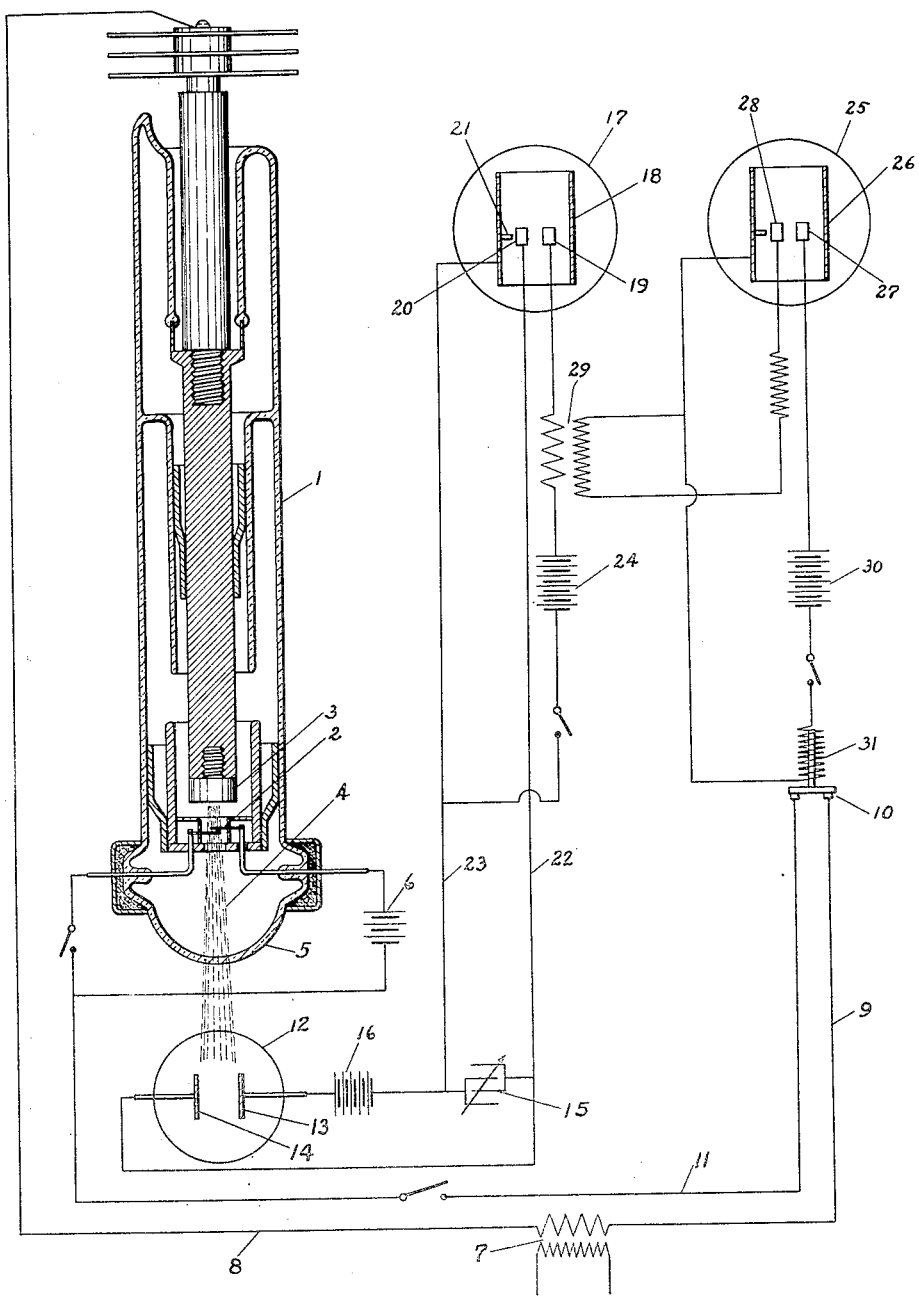

The system illustrated in Fig. 1 comprises an X-ray tube 1 of any suitable construction, having an incandescent cathode 2 and an anode 3. The arrangement of the electrodes is such that the X-rays 4 pass out of the tube axially through one end 5 thereof. The cathode 2 is heated by a suitable battery 6 and operating current is supplied to the cathode and anode from a suitable transformer 7 by conductor 8 connected to the anode and conductor 9, switch 10 and conductor 11, connected to one terminal of the cathode. The X-rays 4 are passed through an ionization chamber 12 having a suitable ionizable gaseous filling and a pair of spaced electrodes 13 and 14. The electrode 13 is connected to one side of a condenser 15 of variable or fixed capacity and the electrode 14 is connected to the opposite side of the condenser. A battery 16 is provided in series with the condenser and the ionization chamber.

For a given ionization chamber 12. The amount of ionization of the gas in the chamber 12 is dependent upon the quantity of X-rays passing therethrough, and the current flowing through the ionization chamber is dependent upon the amount of ionization thereof. Consequently by suitably adjusting the condenser 15 to a definite capacity and assuming no leakage to occur, the condenser may be charged up to a predetermined voltage by the current flowing through the ionization chamber, after a predetermined quantity of X-rays have been passed therethrough.

The terminals of the condenser are connected in the input circuit of an amplification system comprising a glow relay tube 17 of the starting anode type having a cathode 18, a main anode 19 and a starting anode 20. A starting tip 21 extends from the cathode 18 into proximity to the starting anode 20 so as to reduce the effective gap between the cathode and the starting anode. A tube of this type is fully described and claimed in my Patent No. 1,840,055, issued January 5, 1932, for Glow relay tube.

Due to the specific arrangement of the anodes with respect to the cathode, a higher voltage is required to initiate a discharge from the main anode to the cathode than from the starting anode to the cathode and in the operation of such a tube the circuit arrangement is such that normally the voltage applied to the main anode 19 is insufficient to start a discharge through the tube until the resistance of the tube has been decreased by the initiation of a discharge from the starting anode to the cathode. The amount of current required to start a discharge between the starting anode and the cathode is extremely minute being in the neighborhood of only about .1 of a microampere.

The terminals of the condenser 15 are connected respectively to the starting anode 20 and the cathode 18 of the relay tube 17 by conductors 22 and 23 so that when the condenser has been charged to the breakdown voltage of the gap between the starting anode and the cathode, it initiates a low current discharge in the starting anode tube which decreases the resistance of the tube sufficiently to enable a larger current discharge to start between the main anode 19 and the cathode. A suitable source of potential 24 is provided in series with the main anode and the cathode for creating and maintaining this discharge.

With such an arrangement the starting anode gap under the control of the condenser 15 serves as a trigger device for initiating the main discharge from the anode 19. The discharge in the output circuit including the battery 24 and the electrodes 18 and 19 may be of relatively high current flow, that is, of several hundred milliamperes and may be utilized to operate a sensitive relay or switch to control a signal or such current may be still further amplified by a second glow relay tube as shown in the drawing.

The amplifying glow relay tube 25 also is provided with a cathode 26, main anode 27 and starting anode 28 and has the input circuit, including the starting anode 28 and the cathode 26, coupled to the output circuit of the glow relay tube 17 through a transformer 29 so that upon the occurrence of a discharge in the first relay tube, a starting discharge will occur in the second amplifying relay tube. A source of potential 30 is provided for the output circuit of the amplifying tube 25 and the current flowing in the output circuit is utilized to control a switch 10 through a suitable winding 31. The amplifying tube 25 is of a less sensitive, larger output type than the first relay 17 and is capable of supplying very large currents for directly operating electromagnetic relays. This amplification system employing a plurality of glow relay tubes is more fully described in a copending application of Rentschler and Henry, Serial No. 324,557 filed December 7, 1928 and entitled Amplification system for glow relay devices.

With the system described it will be noted that after a predetermined quantity of X-rays have been generated, that the condenser 15 will be charged to a definite potential at which it will initiate a momentary discharge in the glow relay tube 17 and such discharge will enable a larger current continuous discharge to be passed therethrough which when amplified by the second relay tube will operate the switch 10 and open the circuit to the X-ray tube, thus terminating its operation.

The charging of the condenser 15 to the predetermined voltage is determined by the intensity of the X-rays and by the period of application. Therefore, from the time required to charge a condenser of definite capacity the intensity of the X-rays can be readily determined and if the intensity is varied during the period the average intensity is determined.

Figure 2:
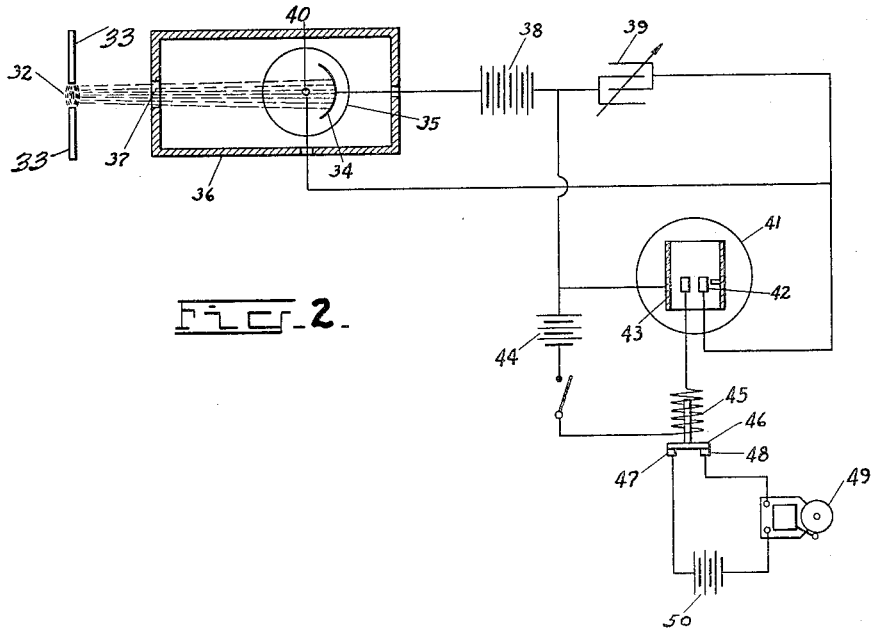
Fig. 2 is a diagrammatic showing of a system for measuring light in the visible or ultraviolet region of the spectrum.

In Fig. 2 I have illustrated an arrangement for indicating the intensity of a source of either visible or ultraviolet light, in which the ionization chamber is replaced by a photo-electric cell which is sensitive to the particular band of radiations being measured.

The source of radiations, which by way of example may comprise an arc 32, produced between electrodes 33, is positioned so as to project the light upon the cathode 34 of a photo-electric cell 35 contained within a closed chamber 36 having an aperture 37 therein. The cathode 34 is electrically connected through a battery 38 to one terminal of the variable condenser 39, the other terminal of which is connected to the anode 40 of the photo-electric cell The condenser 39 is connected in the input circuit of the starting anode tube 41, across the starting anode 42 and cathode 43, as in the embodiment of Fig. 1 and the output circuit of the starting anode tube includes a battery 44 and winding 45 of an electro-magnetic switch 46. The contacts 47 and 48 of the switch are connected to an indicating device 49 through a source of potentials 50.

When the arc 32 is operating, the light produced, causes a current flow through the photo-electric cell 35, the intensity of which is proportional to the intensity of the light source, and the condenser 39 becomes charged up to the breakdown potential of the starting anode tube 41 in a period of time dependent upon the intensity of the light.

By varying the capacity of the condenser, the time required to charge it to the breakdown potential of the starting anode tube, may be varied. With this arrangement if it is desired, for instance to regulate the quantity of ultraviolet light utilized for any desired purpose, the condenser may be adjusted to the proper calibrated capacity so that after the required quantity of rays have been produced, the indicating device 49 will be set into operation to signal the operator.

If it is desired to measure light in the ultraviolet region, the cathode 34 of the photo-electric cell should be composed of a material which is sensitive to this range of frequencies such as cadmium or misch metal, or preferably thorium. For measurements in the red and yellow region the cathode may be coated with a sub-oxide of caesium.

Figure 3:
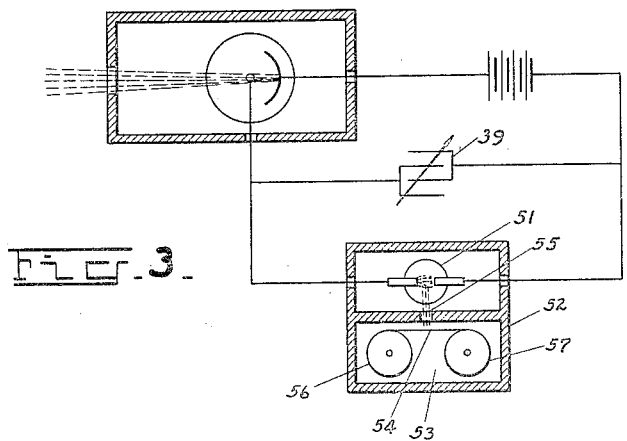
Fig. 3 is a diagrammatic showing of a means for recording the quantity of the radiations.

In some cases it may be desirable to have a continuous record of the quantity of exposure or average intensity of the light prevailing for a definite period. For example, the weather bureau or health department or a doctor giving treatments may desire to know the total quantity of ultra-violet light available on certain days in sunlight or from an artificial source. In Fig. 3 an arrangement is shown for making a permanent recording of the light conditions. In this arrangement the condenser 39 is connected to the terminals of a discharge lamp 51 of the gaseous conduction type. I have found, that when the electrodes of such a lamp are composed of thorium, operating in a gas such as neon, argon or helium, that the breakdown potential is extremely constant. The lamp 51 is contained within a light proof housing 52 having a separate compartment 53 containing a photographically sensitized strip 54 which may be continuously moved at a uniform rate past an aperture 55, as by clock work. The sensitized strip may be fed from a spool 56 and wound upon a second spool 57.

When the condenser 39 becomes charged to the breakdown potential of the lamp 51, it discharges through the lamp producing a momentary flash of light which is recorded upon the sensitized strip 54. When the discharge, which is of an extremely short duration, has passed, the condenser again charges up as light continues to fall on the photo-electric cell until a second discharge occurs. The intensity of the light falling upon the photoelectric cell may be determined by the number of such discharges in a definite interval, the number of discharges per unit time giving the average intensity.

Figure 4:
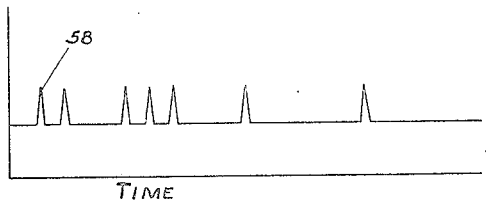
Fig. 4 illustrates a chronographic record of the quantity of the radiations.

In place of the photographic strip 54, the current flow produced upon breakdown of the lamp 51 or similar gaseous conduction device may be used to operate the arm of a countermechanism or of a chronograph. Fig. 4 illustrates a typical chronographic record, in which the vertical lines 58 are records of the discharging of the condenser, the distance between any two vertical lines being inversely proportional to the intensity of the light being measured.

Obviously many changes and refinements may be made in the system and apparatus shown and described without departing from the invention and I desire the foregoing description to be considered as illustrative and not restrictive of the invention defined in the following claims.

What is claimed is:

1. A system for measuring the quantity of electromagnetic radiations emanating from a source, comprising a source of electrical potential, a device responsive to electromagnetic radiations connected to said source, an energy accumulating means connected to said source and to said radiation responsive device for accumulating a charge therein from said source solely by current flow being produced in said radiation responsive device by radiations from the source of electro-magnetic radiations to be measured and only when the same is subjected to such electromagnetic radiations, a gaseous conduction device provided with a cathode, a main anode spaced from said cathode, and a starting anode spaced a lesser distance from said cathode than the main anode and located out of the direct discharge path between the main anode and cathode to inherently cause a definite and constant breakdown potential being required to initiate a discharge between the starting anode and cathode regardless of the potential impressed between the main anode and cathode, a circuit for initiating a discharge in said gaseous conduction device including said energy accumulating means and the starting anode and cathode of said device, an output circuit for said gaseous conduction device including the main anode and cathode of said device, and means responsive to current flow in said output circuit to indicate the fact that a definite quantity of radiations have emanated from the source of electromagnetic radiations over a definite period of time.

2. A system for measuring definite quantities of electromagnetic radiations comprising in combination with an electromagnetic radiation responsive device, a source of electrical energy and a gaseous discharge device, and means for accumulating a definite quantity of electrical energy from said source solely by current flow through said radiation responsive device and only when the same is rendered conductive by subjection to a source of electromagnetic radiations to be measured in order for said accumulated charge to be entirely representative of the quantity of electromagnetic radiations falling upon said radiation responsive device in a given period of time, said gaseous discharge device having a gaseous environment therein and a plurality of electrodes comprising a common cathode, a main anode spaced from said cathode and having a potential impressed therebetween insufficient to start a discharge but high enough to sustain a discharge once initiated, and a starting anode spaced a lesser distance from said cathode than the main anode and located out of the direct discharge path between the main anode and cathode to inherently cause a definite and constant breakdown potential being required to initiate a discharge between the starting anode and cathode regardless of the potential impressed between the main anode and cathode; and an output circuit for said discharge device including said cathode and main anode and means operative by a current flow therein for indicating the fact that a definite quantity of electromagnetic radiations have fallen upon said radiation responsive device.

3. A system for measuring the quantity of electro-magnetic radiations emanating from a source, comprising a circuit including in electrical series an energy storage device, a source of electrical energy and an electromagnetic radiation responsive device subjectable to radiations emanating from a source and operable to cause said source of electrical energy to charge said energy storage device solely by current flow through said radiation responsive device and only when the same is rendered conductive by subjection to a source of electromagnetic radiations to be measured until a predetermined charge is accumulated in said energy storage device; a gaseous conduction device provided with output electrodes comprising a common cathode and a main anode spaced from said cathode, and having a potential impressed thereon which is lower than the breakdown potential necessary to initiate a discharge between said main anode and cathode, but high enough to sustain a discharge once initiated, and a starting anode spaced a lesser distance from said cathode than the main anode and located out of the direct discharge path between the main anode and cathode and connected in electrical parallel relation with said circuit, said starting anode and cathode being so spaced as to inherently cause a definite and constant breakdown potential being required to initiate a discharge therebetween regardless of the potential impressed between the main anode and cathode, and operable to initiate a discharge when the potential of said energy storage device reaches the breakdown potential thereof, means operable to indicate that a definite quantity of radiations have emanated from said source of electro-magnetic radiations over a definite period of time, and means connected to the output electrodes of said gaseous conduction device including a source of electrical energy and a device for operating said last mentioned means in electrical series relationship, and operable upon breakdown of said gaseous conduction device with attendant discharge of said energy storage device.

4. A system for quantitatively measuring electro-magnetic radiations comprising a circuit including a device responsive to electromagnetic radiations, a source of potential and a condenser adapted to accumulate a charge therein from said source solely by current flow through said radiation responsive device and only when the same is rendered conductive by subjection to a source of electromagnetic radiations to be measured, a second circuit including a gaseous conduction device provided with a common cathode, a main anode spaced from said cathode, and a starting anode spaced a lesser distance from said cathode than the main anode and located out of the direct discharge path between said main anode and cathode, with the latter and said starting anode being connected to opposite sides of said condenser, said starting anode and cathode having a definite and constant breakdown potential therebetween and being operative to initiate a discharge when said condenser is charged to the breakdown potential thereof, regardless of the potential impressed between said main anode and cathode, to reduce the resistance of said gaseous conduction device; a third circuit including a source of potential and said main anode and cathode for impressing a potential upon the latter below that necessary to cause a discharge therebetween with attendant current flow but high enough to sustain a discharge once initiated by said starting anode, and means operative in response to current flow in said last mentioned circuit to indicate the fact that a definite quantity of radiations have emanated from said source of electromagnetic radiations over a predetermined period of time.

5. The combination with a source for generating electromagnetic radiations, of an electromagnetic radiation responsive device subject to radiations from said source, a source of electrical potential and an energy accumulating device in circuit with said radiation responsive device for accumulating a charge from said source of electrical potential solely by current flow through said radiation responsive device and only when the latter is subjected to electromagnetic radiations to be measured, a gaseous conduction device provided with a common cathode, a main anode spaced from said cathode and having a potential impressed therebetween insufficient to start a discharge but high enough to sustain a discharge once initiated, and a starting anode spaced a lesser distance from said cathode than the main anode and located out of the direct discharge path between the main anode and cathode to inherently cause a definite and constant breakdown potential being required to initiate a discharge between the starting anode and cathode regardless of the potential impressed between the main anode and cathode, an input circuit for said gaseous conduction device including the starting anode and cathode thereof and said energy accumulating means, an output circuit for said gaseous conduction device, and means responsive to current flow in said output circuit to indicate the fact that a definite quantity of radiations have emanated from said source of electromagnetic radiations over a definite period of time.

6. Apparatus for measuring the quantity of electromagnetic radiations comprising an electrical discharge device subject to such radiations, a source of potential and a condenser in circuit with said device, a glow relay tube of the starting anode type, input and output circuits for said relay tube, the input circuit being operatively connected to said condenser, amplifying means coupled to said output circuit, and means responsive to current flow in said amplifying means for setting electrical apparatus into operation.

7. The combination with a source for generating electromagnetic radiations, of means for measuring the quantity of radiations emanating from said source comprising an energy storage means, a source of electrical energy for charging said energy storage means, electromagnetic radiation responsive means subjectable to radiations emanating from said source and operable to cause energy to be supplied by said source of electrical energy to said energy storage means, a gaseous conduction device having a definite break down potential connected to said energy storage means and operable to cause discharge of said energy storage means when the potential thereof reaches the break down value of said gaseous conduction device, and means operable upon break down of said gaseous conduction device with attendant discharge of said energy storage means to cause a cessation in the generation of electromagnetic radiations by said first mentioned source upon the emanation of a predetermined quantity of radiations over a given period of time.

8. The combination with an X-ray tube, of an ionization chamber subject to X-radiations therefrom, a source of potential and a condenser in circuit with said ionization chamber, a relay tube having a definite breakdown voltage, an input circuit for said relay tube including said condenser, an output circuit for said relay tube, and means responsive to current flow in said output circuit for controlling the operation of said X-ray tube.

9. The combination with an X-ray tube, of a circuit for supplying current thereto, an ionization chamber subject to X-radiations from said tube, a source of potential in circuit with said chamber, a relay tube having a definite breakdown potential, an input circuit for said relay tube, means in said input circuit operative upon a predetermined flow of electricity through said ionization chamber to produce a discharge in said relay tube, an output circuit for the relay tube, a switch in the X-ray tube circuit, and means controlled by current in said output circuit for operating said switch.

10. The combination with an X-ray tube, of an ionization chamber subject to X-radiations therefrom, a source of potential and a condenser in circuit with said ionization chamber, a glow relay tube of the starting anode type having an input circuit including said starting anode and condenser, an output circuit for said relay tube, a source of current for said output circuit, and means responsive to current flow in the output circuit for terminating the operation of said X-ray tube.

11. The combination with an X-ray tube, of an ionization chamber subject to X-radiations therefrom, a source of potential and a variable condenser in circuit with said ionization chamber, a glow relay tube of the starting anode type having an input circuit including said starting anode and condenser, an output circuit for said relay tube, a source of direct current in said output circuit and means responsive to current flow in said output circuit for terminating the operating of said X-ray tube.

12. The combination with an X-ray tube of an ionization chamber subject to X-radiations therefrom, a source of potential and a condenser in circuit with said ionization chamber, a glow relay tube of the starting anode type having an input circuit including said starting anode and condenser, an output circuit for said relay tube, a source of current in said output circuit, and means responsive to current flow in the output circuit for controlling the operation of said X-ray tube.

13. The combination with an X-ray tube, of a circuit for supplying current thereto, an ionization chamber subject to X-radiations from said tube, a source of potential and a variable condenser in circuit with said ionization chamber, a glow relay tube of the starting anode type having an input circuit including said starting anode and condenser, an output circuit for said relay tube, a source of direct current in said output circuit, a glow relay amplifier having an input circuit coupled with said output circuit, and an output circuit for said amplifier tube, and means in said latter output circuit for controlling the operation of said X-ray tube.

HARVEY C. RENTSCHLER.